United States Patent
Rachid

(10) Patent No.: US 12,166,516 B2
(45) Date of Patent: Dec. 10, 2024

(54) ADAPTIVE WIDEBAND INTERFERENCE CANCELLATION FOR MIMO NETWORKS

(71) Applicant: SILVUS TECHNOLOGIES, INC., Los Angeles, CA (US)

(72) Inventor: Mansour Rachid, Los Angeles, CA (US)

(73) Assignee: SILVUS TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/658,415

(22) Filed: Apr. 7, 2022

(65) Prior Publication Data

US 2022/0393710 A1 Dec. 8, 2022

Related U.S. Application Data

(60) Provisional application No. 63/208,333, filed on Jun. 8, 2021.

(51) Int. Cl.
*H04B 1/04* (2006.01)
*H04B 1/00* (2006.01)

(52) U.S. Cl.
CPC ......... *H04B 1/0483* (2013.01); *H04B 1/0057* (2013.01); *H04B 1/0078* (2013.01)

(58) Field of Classification Search
CPC ...... H04B 1/525; H04B 1/1036; H04B 15/00; H04B 17/318; H04B 1/0475; H04B 1/715; H04B 17/345; H04B 1/10; H04B 1/71; H04B 7/0413; H04B 17/336; H04B 1/0042; H04B 2001/1045; H04B 17/373; H04B 1/0003; H04B 1/401; H04B 1/713; H04B 15/02; H04B 2001/0408; H04L 5/1461; H04L 5/14; H04L 25/0204; H04L 25/0212; H04L 25/025; H04L 27/2647; H04L 5/0007; H04L 5/006; H04L 5/0073;
(Continued)

(56) References Cited

U.S. PATENT DOCUMENTS

| 5,418,784 A | 5/1995 | Ramakrishnan et al. |
| 5,436,903 A | 7/1995 | Yang et al. |

(Continued)

FOREIGN PATENT DOCUMENTS

| CN | 303605235 | 3/2016 |
| CN | 305391642 | 10/2019 |

(Continued)

OTHER PUBLICATIONS

Boksiner, et al., "Centrally Controlled Dynamic Spectrum Access for MANETs" 2013 IEEE Military Communications Conference, IEEE Computer Society, 978-0-7695-5124, pp. 641-646, Milcom, Jan. 2013.

(Continued)

*Primary Examiner* — Golam Sorowar
(74) *Attorney, Agent, or Firm* — Knobbe, Martens, Olson & Bear, LLP

(57) ABSTRACT

Certain disclosed embodiments pertain to suppressing interference in a wireless communication system. For example, a method of suppressing interference can include receiving one, two, or more first signals including components from a plurality of sub-channels. Each of the first signals can be processed by a Finite Impulse Response filter adapted using an LMS update algorithm.

21 Claims, 8 Drawing Sheets

(58) Field of Classification Search
CPC ... H04L 25/022; H04L 25/08; H04L 25/0224; H04L 25/0328; H04L 25/03821; H04L 41/069; H04L 5/0026; H04L 5/0032; H04L 27/2623; H04L 27/2691; H04W 24/08; H04W 72/541; H04W 24/10; H04W 28/04; H04W 52/243; H04W 24/02; H04W 28/0236; H04W 72/0453; H04W 72/542; H04W 72/0446; H04W 16/28; H04W 4/02; H04W 4/023; H04W 4/029; H04W 40/16; H04W 52/04; H04W 52/14; H04W 64/00; H04W 64/006

See application file for complete search history.

(56) References Cited

U.S. PATENT DOCUMENTS

| | | | |
|---|---|---|---|
| 6,038,225 | A | 3/2000 | Nago |
| 6,556,582 | B1 | 4/2003 | Redi |
| 6,754,176 | B1 | 6/2004 | Gubbi et al. |
| 6,760,371 | B1* | 7/2004 | Bach ............... H04L 25/03038 375/232 |
| 6,788,658 | B1 | 9/2004 | Bims |
| 6,980,561 | B1 | 12/2005 | Abi-Nassif |
| 8,107,966 | B2 | 1/2012 | Choi et al. |
| 8,160,090 | B2 | 4/2012 | Yoshizawa et al. |
| 8,462,709 | B2 | 6/2013 | Nanda et al. |
| 8,483,620 | B2 | 7/2013 | Horn et al. |
| 8,588,091 | B2 | 11/2013 | Trainin |
| 8,837,435 | B2 | 9/2014 | Singh et al. |
| 8,861,445 | B2 | 10/2014 | Jing et al. |
| 8,873,470 | B2 | 10/2014 | Cordeiro et al. |
| 8,879,573 | B2 | 11/2014 | Bahl et al. |
| 8,913,597 | B2 | 12/2014 | Benveniste |
| 9,014,207 | B2 | 4/2015 | Goel et al. |
| 9,094,986 | B2 | 7/2015 | Horn et al. |
| 9,173,235 | B2 | 10/2015 | Lim et al. |
| 9,407,298 | B1* | 8/2016 | Hwang ............... H04B 1/10 |
| D908,137 | S | 1/2021 | Varghese et al. |
| 11,188,445 | B2 | 11/2021 | Knowles et al. |
| 11,226,126 | B2 | 1/2022 | Przybylski et al. |
| 11,226,975 | B2 | 1/2022 | Patthak et al. |
| 11,258,807 | B2 | 2/2022 | Muddu et al. |
| 11,290,348 | B1 | 3/2022 | Margaria et al. |
| 11,294,789 | B2 | 4/2022 | Knowles et al. |
| 11,340,931 | B2 | 5/2022 | Krishna et al. |
| D982,021 | S | 3/2023 | Daneshvar et al. |
| 2004/0071154 | A1 | 4/2004 | Wentink |
| 2004/0146022 | A1 | 7/2004 | Lewis et al. |
| 2004/0240426 | A1 | 12/2004 | Wu et al. |
| 2007/0177520 | A1 | 8/2007 | Morinaga et al. |
| 2009/0262688 | A1 | 10/2009 | Tsai et al. |
| 2010/0075704 | A1 | 3/2010 | McHenry et al. |
| 2010/0165899 | A1 | 7/2010 | Van Bosch et al. |
| 2011/0314145 | A1 | 12/2011 | Raleigh et al. |
| 2012/0082040 | A1 | 4/2012 | Gong et al. |
| 2012/0327870 | A1 | 12/2012 | Grandhi et al. |
| 2013/0058222 | A1 | 3/2013 | Ben Yehezkel et al. |
| 2013/0163575 | A1 | 6/2013 | Pak et al. |
| 2013/0201857 | A1 | 8/2013 | Bhargava et al. |
| 2014/0050203 | A1 | 2/2014 | Doppler et al. |
| 2014/0066050 | A1 | 3/2014 | Kotecha et al. |
| 2014/0079016 | A1 | 3/2014 | Dai et al. |
| 2014/0092877 | A1 | 4/2014 | Kazmi et al. |
| 2014/0094130 | A1* | 4/2014 | Elenes ............... H04B 7/0845 455/132 |
| 2014/0169290 | A1 | 6/2014 | Seok |
| 2014/0307639 | A1 | 10/2014 | Jung et al. |
| 2014/0328265 | A1 | 11/2014 | Sampath et al. |
| 2015/0245282 | A1 | 8/2015 | Kim et al. |
| 2015/0264689 | A1 | 9/2015 | Sampath et al. |
| 2015/0333933 | A1* | 11/2015 | Lopez de Victoria ................. H04L 25/0212 375/346 |
| 2016/0050683 | A1 | 2/2016 | Gupta et al. |
| 2016/0337094 | A1 | 11/2016 | Andreoli-Fang et al. |
| 2017/0085334 | A1* | 3/2017 | Ishioka ............... H04L 27/2605 |
| 2017/0357389 | A1 | 12/2017 | Fleizach et al. |
| 2019/0174383 | A1 | 6/2019 | Zhang et al. |
| 2019/0281507 | A1 | 9/2019 | Rahat et al. |
| 2019/0320462 | A1 | 10/2019 | Li et al. |
| 2020/0084759 | A1 | 3/2020 | Liu et al. |
| 2021/0028962 | A1 | 1/2021 | Schelstraete et al. |
| 2021/0153089 | A1 | 5/2021 | Nayak et al. |
| 2022/0385547 | A1 | 12/2022 | Daneshvar et al. |

FOREIGN PATENT DOCUMENTS

| | | |
|---|---|---|
| EP | 2088811 A1 | 8/2009 |
| EP | 1603283 B1 | 9/2010 |
| EP | 2744292 A1 | 6/2014 |
| EP | 2866514 A2 | 4/2015 |
| KR | 2006010018 A | 2/2006 |
| WO | WO 2005039105 A1 | 4/2005 |
| WO | WO 2006106459 A1 | 10/2006 |
| WO | WO 2007098136 A2 | 8/2007 |
| WO | WO 2011129634 A3 | 1/2012 |
| WO | WO 2014124131 A2 | 8/2014 |

OTHER PUBLICATIONS

Jones et al., "A Dynamic Spectrum Access Mac Applique for Legacy Military Radios" The John Hopkins University Applied Physics Laboratory, 978-1-4244-2677, pp. 1-5, Milcom, May 2008.

Kumar et al., "Medium Access Control Protocol for AD-HOC Wireless Networks: A Survey" Electrical and Computer Engineering Department, Clarkson University, Embedded Software for Digital Televisions Group, ATI Research, and Department of Computer Science, University of New Orleans, pp. 1-54, 2004.

Marinho et al., "Cognitive Radio: Survey on Communication Protocols, Spectrum Decision Issues, and Future Research Directions" Wireless Netw, vol. 18, pp. 147-164, 2012.

Nasipuri, et al., "Performance of Multichannel Wireless Ad HOC Networks" Int. J. Wireless and Mobile Computing, vol. 1, Nos. ¾, pp. 191-203, 2006.

Park et al., Performance of Joint Spectrum Sensing and MAC Algorithms for Multichannel Opportunistic Spectrum Access Ad Hoc Networks, IEEE Transactions on Mobile Computing, vol. 10, No. 7, pp. 1011-1027, Jul. 2011.

Perich et al., "Efficient Dynamic Spectrum Access Implementation" The 2010 Military Communications Conference—Unclassified Program—Networking Protocols and Performance Track, 978-1-4244-8180, pp. 1887-1892, Apr. 2010.

Redi, et al., "The DARPA WNaN Network Architecture" The 2011 Military Communications Conference—Track 6—Department of Defense Programs, 978-1-4673-0081, pp. 2258-2263, 2011.

Seelig, et al. "A Description of the Aug. 2006 XG Demonstrations at Fort A. P. Hill" U.S. Department of Defense Advanced Research Projects Agency, 1-4244-0663, pp. 1-12, Mar. 2007.

Shiang et al., "Distributed Resource Management in Multihop Cognitive Radio Networks for Delay-Sensitive Transmission" IEEE Transactions on Vehicular Techonology, vol. 58, No. 2, pp. 941-953, Feb. 2009.

Ye, et al., "An Energy-Efficient MAC Protocol for Wireless Sensor Networks" Information Science Institute, University of Southern California Computer Science Department, 2011.

Yucek et al., "A Survey of Spectrum Sensing Alforithms for Cognitive Radio Applications" IEEE Communications Surveys & Tutorials, vol. 11, No. 1, pp. 116-130, 2009.

Zhao et al., "A Survey of Dynamic Spectrum Access" IEEE Signal Processing Magazine 1053-5888, pp. 79-89, May 2007.

Zhao et al., "Decentralized Cognitive MAC for Opportunistic Spectrum Access in Ad Hoc Networks: A POMDP Framework" IEEE Journal on Selected Areas in Communications, vol. 25, No. 3, pp. 589-600, Apr. 2007.

The Mac Level (link layer), downloaded on Dec. 7, 2015 from website: http://www.labs.hpe.com/personal/Jean_Tourrilhes/Linux/Linux.Wireless.mac.html, 2000.

(56) References Cited

OTHER PUBLICATIONS

Chevillat, et al., "Dynamic Data Rate and Transmit Power Adjustment in IEEE 802.11 Wireless LANs," Int J Wireless Inf Networks 12, 123-145 (2005).
Holland, et al., "A Rate-Adaptive MAC Protocol for Multi-Hop Wireless Networks," In Proceedings of the 7th annual international conference on Mobile computing and networking (MobiCom '01). Association for Computing Machinery, New York, NY, USA, 236-251.
Qiao, et al., "Goodput enhancement of IEEE 802.11a wireless LAN via link adaptation," ICC 2001. IEEE International Conference on Communications. Conference Record (Cat. No. 01CH37240), Helsinki, Finland, pp. 1995-2000 vol.7, 2001.
SC3500 Quick Start Guide CSMA, Doc. 10009C000 Version 1.2, dated May 10, 2012; 10 pages.
SteamCaster MIMO Radio User Manual, Doc. 10017C000 Version 3.12, dated Jun. 2, 2015; 70 pages.
SteamCaster MIMO Radio User Manual, Doc. 10017C000 Version 3.12.5, dated Oct. 7, 2016; 92 pages.
SteamCaster MIMO Radio User Manual, Doc. 10017C000 Version 3.15.0.3, dated Sep. 4, 2018; 146 pages.
SteamCaster MIMO Radio User Manual, Doc. 10017C000 Version 3.15.0.4, dated Oct. 23, 2018; 134 pages.
SteamCaster MIMO Radio User Manual, Doc. 10017C000 Version 3.15.0.5, dated Dec. 19, 2018; 137 pages.
SteamCaster MIMO Radio User Manual, Doc. 10017C000 Version 3.17.0.5, dated Apr. 30, 2019; 158 pages.

\* cited by examiner

ADAPTIVE WIDEBAND INTERFERENCE CANCELLATION FOR MIMO NETWORKS

STATEMENT REGARDING FEDERALLY SPONSORED R&D

This invention was made with Government support under Contract H92222-17-C-0056 awarded by USSOCOM. The Government has certain rights in the invention.

BACKGROUND

Field of the Invention

This disclosure relates generally to communication systems and, more particularly, to systems, methods and devices for mitigating interference in a communication system.

Description of the Related Art

Wireless communication systems are widely deployed to provide various types of communication (e.g., voice, data, multimedia services, etc.) to multiple users. As the demand for various types of wireless communication grows, there lies a challenge to implement efficient and robust communication systems. Wireless communication is made difficult by various factors that corrupt transmitted signals, such as for example, the presence of noise, multipath fading and interfering signals.

Certain existing communications system standards suffer from various drawbacks such as, for example, a lack of effective and constructive methods for compensating for interference or certain types of noise. Interference becomes an issue as devices are allowed to operate in the same band without pre-determined frequency, temporal, or spatial planning.

Attempts to mitigate this issue involve using adaptive cancellation techniques that require reference signals. However, the use of a reference signal is not always practical. Covariance based techniques can cancel interference in the absence of a wanted signal, but if a wanted signal is present, knowledge of reference samples is required.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

In some examples, a method of suppressing interference in a wireless communication system can include: receiving a first input signal at a first antenna; receiving a second input signal at a second antenna; generating, using a first set of filter weights and the first input signal, a first filtered output; generating, using a second set of filter weights and the second input signal, a second filtered output; determining a first error signal based on a sum of the first filtered output and the second filtered output; and updating the first and second filter weights based on the first error signal, wherein the updating may be performed in accordance with a minimization of power in the first error signal and wherein at least one filter weight of the first set of filter weights may be fixed to a predetermined value.

In some examples, the method can include generating, using a third set of filter weights and the first input signal, a third filtered output; generating, using a fourth set of filter weights and the second input signal, a fourth filtered output; determining a second error signal based on a sum of the third filtered output and the fourth filtered output; and updating the third and fourth set of filter weights based on the second error signal, wherein the updating may be performed in accordance with a minimization of power in the second error signal. In some examples, at least one filter weight of the third set of filter weights may be fixed to a predetermined value. In some examples, the predetermined value may be 1.

In some example, the first set of filter weights or the second set of filter weights may be associated with an FIR filter.

In some examples, the method can include outputting the first error signal to a modem.

In some examples, the modem may be configured to demodulate or decode the first error signal.

In some examples, the method include demodulating the first error signal to produce a demodulated pack of bits.

In some examples, a filter weight of the first set of filter weights can include a center tap. In some examples, the center tap may be fixed to the predetermined value.

In some examples, the method can include determining whether a packet may be present in the first or second input signals.

In some examples, updating the first error signal may be based on the first and second set of filter weights may be in response to determining that a packet may be not present in the first or second input signals.

In some examples, the first and second input signals may be sampled according to a predetermined sampling period.

In some examples, updating the first error signal may be based on the first and second set of filter weights may be performed for each sample of the first and second input signals.

In some examples, the method may include: in response to determining that a packet may be present: determining a third error signal different from the first error signal; updating the third error signal based on a difference between a first portion of the packet and a second portion of the packet, wherein the updating may be performed in accordance with a minimization of power in the third error signal and wherein at least one filter weight of the first set of filter weights may be fixed to a predetermined value.

In some examples, the second portion of the packet can include a repeated portion.

In some examples, the packet can include a signal of interest component and at least one of a noise component or an interference component and wherein the second portion of the packet can include at least a portion of a signal of interest component present in the first portion of the packet.

In some examples, the first input signal or the second input signal can include an OFDM signal.

In some examples, the first input signal or the second input signal can include an OFDM signal and wherein the second portion of the signal can include a cyclic prefix.

In some examples, the method can include: receiving a third input signal at a third antenna; receiving a fourth input signal at a fourth antenna; generating, using a fifth set of filter weights and the third input signal, a fifth filtered output; generating, using a sixth set of filter weights and the fourth input signal, a sixth filtered output; determining a fourth error signal based on a sum of the fifth filtered output and the sixth filtered output; and updating the fourth error signal based on the fifth and sixth set of filter weights, wherein the updating may be performed in accordance with a minimization of power in the fourth error signal and wherein at least one filter weight of the fifth set of filter weights may be fixed to a predetermined value.

In some examples, a method of suppressing interference in a wireless communication system can include: receiving a first input signal at a first antenna; receiving a second input signal at a second antenna, wherein the first or second input signals can include at least one OFDM signal, the OFDM signal can include multiple OFDM symbol periods; generating, using a first set of filter weights and the first input signal, a first filtered output, wherein at least one filter weight of the first set of filter weights may be fixed to a predetermined value; generating, using a second set of filter weights and the second input signal, a second filtered output; estimating an interference component of the at least one OFDM signal based on a difference between a first portion of the first filtered output and a second portion of the first filtered output; and updating at least one of the first set of filter weights or the second set of filter weights based on the estimated interference component of the at least one OFDM signal.

In some examples, the second portion of the first filtered output can include a cyclic prefix, the cyclic prefix can include at least a portion of a signal of interest component present in the first portion of the at least one OFDM signal.

In some examples, the first set of filter weights or the second set of filter weights may be associated with an FIR filter.

In some examples, the method can include determining a signal of interest component of the first filtered output based on the updated first set of filter weights or the second set of filter weights.

In some examples, the method can include passing the signal of interest component to a modem configured to demodulate or decode the first error signal.

In some examples, the method can include demodulating the signal of interest component to produce a demodulated pack of bits.

In some examples, the predetermined value may be 1.

In some examples, a filter weight of the first set of filter weights can include a center tap. In some examples, the center tap may be fixed to the predetermined value.

In some examples, an interference mitigation system can include: a plurality of antennas configured to receive a plurality of input signals, wherein each input signal may be received at a different antenna; an update module in communication with the plurality of antennas, the update module having a filter for each input signal and configured to: filter each of the plurality of input signals at a corresponding filter to produce a plurality of filtered input signals; generating an error signal based on a sum of filtered input signals; and updating filter weights of the corresponding filters for each input signal based on the error signal while maintaining at least one coefficient of one of the corresponding filters fixed at a predetermined value.

In some examples, at least one of the plurality of input signals can include an OFDM signal.

In some examples, the filter weights may be associated with at least one FIR filter.

In some examples, the update module may be configured to determine a signal of interest component of at least one input signal based on the error signal.

In some examples, the update module may be configured to pass the signal of interest component to a modem configured to demodulate or decode the first error signal.

In some examples, the update module may be configured to demodulate the signal of interest component to produce a demodulated pack of bits.

In some examples, the predetermined value may be 1.

In some examples, a filter weight of the first set of filter weights can include a center tap.

In some examples, the center tap may be fixed to the predetermined value.

In some examples, an interference mitigation system can include: a plurality of antennas configured to receive a plurality of input signals, wherein each input signal may be received at a different antenna; one or more hardware processors in communication with the plurality of antennas configured to: receive a first input signal at a first antenna of the plurality of antennas; receive a second input signal at a second antenna of the plurality of antennas; generate, using a first set of filter weights and the first input signal, a first filtered output; generate, using a second set of filter weights and the second input signal, a second filtered output; determine a first error signal may be based on a sum of the first filtered output and the second filtered output; and update, in accordance with a minimization of power in the first error signal, the first and second filter weights may be based on the first error signal, and wherein at least one filter weight of the first set of filter weights may be fixed to a predetermined value.

In some examples, the one or more hardware processors may be configured to: generate, using a third set of filter weights and the first input signal, a third filtered output; generate, using a fourth set of filter weights and the second input signal, a fourth filtered output; determine a second error signal may be based on a sum of the third filtered output and the fourth filtered output; and update, in accordance with a minimization of power in the second error signal, the third and fourth set of filter weights may be based on the second error signal.

In some examples, at least one filter weight of the third set of filter weights may be fixed to a predetermined value.

In some examples, the first set of filter weights or the second set of filter weights may be associated with an FIR filter.

In some examples, the one or more hardware processors may be configured to output the first error signal to a modem.

In some examples, the modem may be configured to demodulate or decode the first error signal.

In some examples, the one or more hardware processors may be configured to demodulate the first error signal to produce a demodulated pack of bits.

In some examples, the predetermined value may be 1.

In some examples, a filter weight of the first set of filter weights can include a center tap.

In some examples, the center tap may be fixed to the predetermined value.

In some examples, the one or more hardware processors may be configured to determine whether a packet may be present in the first or second input signals.

In some examples, updating the first error signal may be based on the first and second set of filter weights may be in response to determining that a packet may be not present in the first or second input signals.

In some examples, the first and second input signals may be sampled according to a predetermined sampling period.

In some examples, updating the first error signal may be based on the first and second set of filter weights may be performed for each sample of the first and second input signals.

In some examples, the one or more hardware processors may be configured to: in response to determining that a packet may be present: determine a third error signal different from the first error signal; update the third error signal may be based on a difference between a first portion of the packet and a second portion of the packet, wherein the updating may be performed in accordance with a minimization of power in the third error signal and wherein at least one filter weight of the first set of filter weights may be fixed to a predetermined value.

In some examples, the second portion of the packet can include a repeated portion.

In some examples, the packet can include a signal of interest component and at least one of a noise component or an interference component and wherein the second portion of the packet can include at least a portion of a signal of interest component present in the first portion of the packet.

In some examples, the first input signal or the second input signal can include an OFDM signal.

In some examples, the first input signal or the second input signal can include an OFDM signal and wherein the second portion of the signal can include a cyclic prefix.

In some examples, the one or more hardware processors may be configured to: receive a third input signal at a third antenna of the plurality of antennas; receive a fourth input signal at a fourth antenna of the plurality of antennas; generate, using a fifth set of filter weights and the third input signal, a fifth filtered output; generate, using a sixth set of filter weights and the fourth input signal, a sixth filtered output; determine a fourth error signal may be based on a sum of the fifth filtered output and the sixth filtered output; and update the fourth error signal may be based on the fifth and sixth set of filter weights, wherein the updating may be performed in accordance with a minimization of power in the fourth error signal and wherein at least one filter weight of the fifth set of filter weights may be fixed to a predetermined value.

In some examples, an interference mitigation system can include: a plurality of antennas configured to receive a plurality of input signals, wherein each input signal may be received at a different antenna; one or more hardware processors in communication with the plurality of antennas configured to: receive a first input signal at a first antenna; receive a second input signal at a second antenna, wherein the first or second input signals can include at least one OFDM signal, the OFDM signal can include multiple OFDM symbol periods; generate, using a first set of filter weights and the first input signal, a first filtered output, wherein at least one filter weight of the first set of filter weights may be fixed to a predetermined value; generate, using a second set of filter weights and the second input signal, a second filtered output; estimate an interference component of the at least one OFDM signal may be based on a difference between a first portion of the first filtered output and a second portion of the first filtered output; and update at least one of the first set of filter weights or the second set of filter weights may be based on the estimated interference component of the at least one OFDM signal.

In some examples, the second portion of the first filtered output can include a cyclic prefix, the cyclic prefix can include at least a portion of a signal of interest component present in the first portion of the at least one OFDM signal.

In some examples, the first set of filter weights or the second set of filter weights may be associated with an FIR filter.

In some examples, the one or more hardware processors may be configured to determine a signal of interest component of the first filtered output may be based on the updated first set of filter weights or the second set of filter weights.

In some examples, the one or more hardware processors may be configured to pass the signal of interest component to a modem configured to demodulate or decode the first error signal.

In some examples, the one or more hardware processors may be configured to demodulate the signal of interest component to produce a demodulated pack of bits.

In some examples, the predetermined value may be 1.

In some examples, a filter weight of the first set of filter weights can include a center tap.

In some examples, the center tap may be fixed to the predetermined value.

BRIEF DESCRIPTION OF THE DRAWINGS

These and other sample aspects of the disclosure will be described in the detailed description and the appended claims that follow, and in the accompanying drawings.

Figure 1:
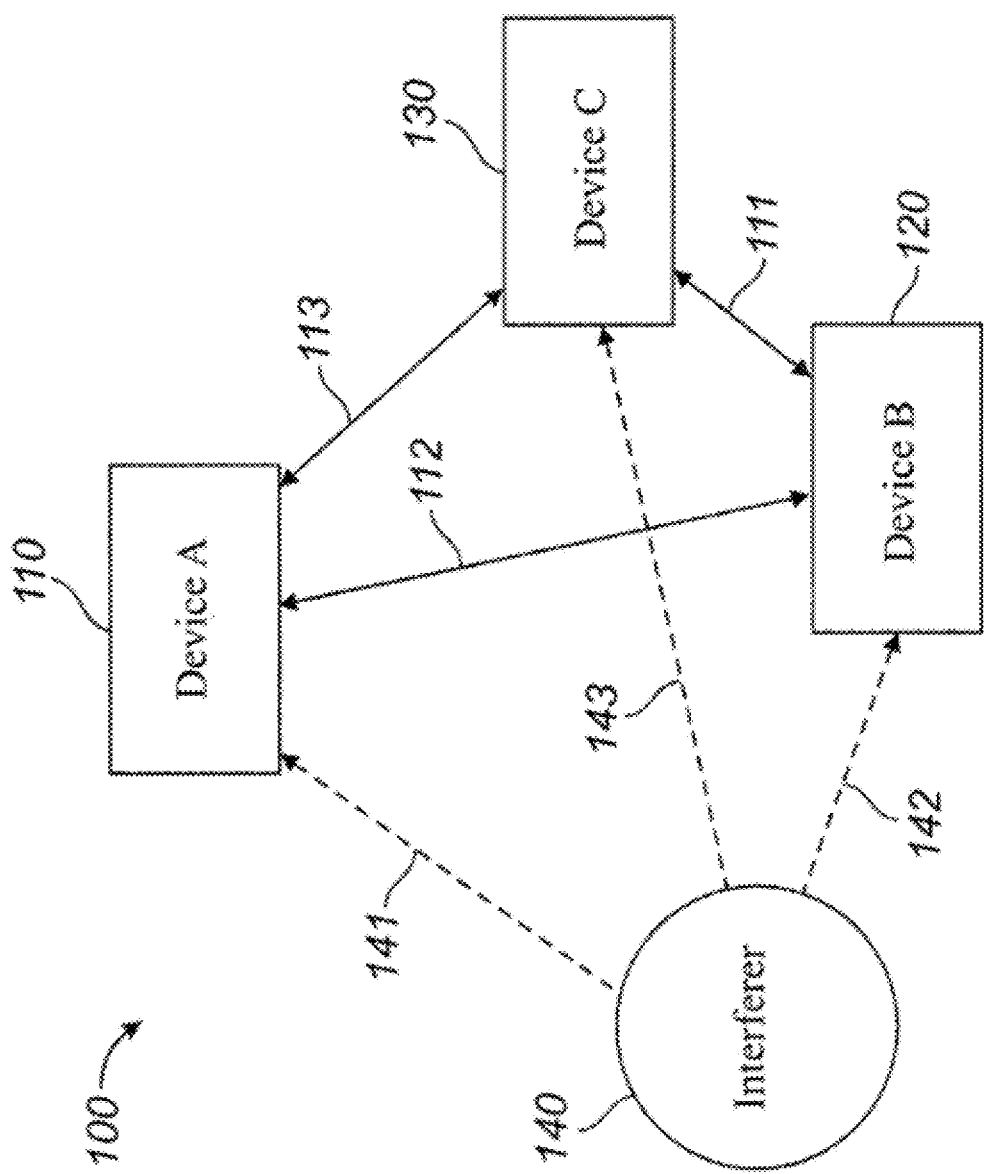
FIG. 1 is a simplified block diagram of a wireless communication network with an interferer.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Wireless communications are made difficult by various factors, such as for example, the presence of noise, multipath fading and interfering signals. Signals received by a communication device can be modeled as having two components: 1) a signal of interest and 2) other signals, including noise and interference. The signal of interest includes information a transmitter transmits to a receiver. The rest of the signal includes noise and/or interference that make it difficult to discern the signal-of-interest. There are various types of interference. For example, certain types of interference are the result transmission from other devices, or natural phenomena that emit electromagnetic radiation in a frequency band used for communication. Interference can also be created by multiple reflections of a desired signal arriving at a receiver at different times. Those skilled in the art will appreciate that there are numerous types of interference and an enumeration of each type of interference has not been provided herein for the sake of brevity.

FIG. 1 is a block diagram of a wireless communication network with an interferer (or jammer). The wireless communication network 100 comprises three communication devices 110, 120, 130 in data communication with each other over a number of channels 111, 112, 113. When the first device 110, labeled Device A, transmits information to the second device 120, labeled Device B, over a wireless channel 112, the second device 120 receives both the transmitted information and noise. Noise sources in wireless data communication include, but are not limited to, background radiation, thermal noise, electronic noise, etc. The second device 120 can also receive a signal from an interferer 140 over another wireless communication channel 142. The interferer 140 may, for example, be attempting to transmit information to the third device 130, labeled Device C, be transmitting information within another wireless communication network, or transmitting a jamming signal to interfere with the network. Although the interferer 140 may be transmitting information, from the point of view of the second device 120, the interferer 140 is a noise source.

Various methods of communicating in the presence of noise and/or interference have been developed, including the use of multiple transmitters and/or multiple receivers at one or more of the communicating devices. For example, IEEE 802.11n is a proposed amendment to the IEEE 802.11-2007 wireless networking standard to significantly improve network throughput over previous standards, such as 802.11b and 802.11g, by using a multiple-input/multiple-output (MIMO) system.

Nevertheless, some existing communications system standards lack effective and constructive methods for compensating for interference and/or noise. In particular, the unlicensed nature of the ISM (Industrial, Scientific, and Medical) bands often requires communication devices that use the ISM bands to tolerate interference from other equipment. Interference from other devices becomes an issue as devices are allowed to operate in the same band without pre-determined frequency, temporal, or spatial planning.

Disclosed herein are methods relating to interference cancellation in wireless transceivers whereby an interfering signal is cancelled or mitigated by a combination of received signals from multiple antenna elements. The system uses an adaptive time domain, Finite Impulse Response (FIR) filter approach. The values of FIR filters are determined based on an adaptive algorithm, such as least mean squares (LMS). Advantageously, in some cases, this adaptive time domain technique may allow for interference tracking with more degrees of freedom than frequency domain techniques and also may allow interference tracking during packet reception. For example, in some cases, this adaptive time domain technique allows for cancellation of interference without knowledge of the content of a wanted signal and thus allows for adapting such cancellation whether a wanted signal exists or not. It is of note that aspects of the present technique are applicable to time domain implementations, such as with the application of FIR filters, as well as frequency domain implementations, such as with the application of synthesis and analysis filters. Advantages in complexity and effectiveness of applying the present technique in the time domain, especially, may exist when compared to other techniques.

Other attempts at interference mitigation require a reference signal. For example, other attempts at interference mitigation use adaptive cancellation techniques or covariance based techniques. Adaptive cancellation techniques require a reference signal in order to calculate combining weights that minimize residual error. In contrast, in some cases the present technique can cancel interference by itself without the presence of a reference signal. Covariance based techniques can cancel interference in the absence of a wanted signal. However, if a wanted signal is present, covariance based techniques require knowledge of a reference sample. For example, a controller applying a covariance based technique may calculate a covariance matrix based on a signal received with 2 antennas during a period when there is no packet. A controller may then apply the inverse of that matrix to cancel interference. In contrast, the present technique can adapt and cancel interference during the reception (or decoding or demodulation) of signals, such as OFDM signals, without requiring insertion of silent periods or reference pilot signals.

Further, other attempts at interference mitigation have difficulty handling tough channel conditions. With existing systems, in the frequency domain (FD), channel response as a result of interference can vary across the band. Prior systems slice up the spectrum in the frequency domain to create parallel paths and correct one section of a signal at a time. This sectioning can reduce issues caused by variation across the band. This frequency domain solution is easy to implement because it is mathematically simple. However, the solution limits selectivity or how much variation can be supported in the signal.

In contrast, in the same number of hardware devices, in the time domain, an interference mitigation system can achieve much more selectivity. This is important in environments with a lot of reflectivity, such as urban environments where signals reflect off of buildings and other obstacles. However, a problem with current time domain approaches is that it is prohibitive to implement due to large covariance inversion matrices. The present system uses a time domain approach without a reference signal in some cases, thus avoiding prohibitive computational processes while maintaining good selectivity.

Another advantage of the present technique is that it can adapt a filter through the received packet. With the previous techniques, large chunks of input data are used to update an interference mitigation filter. However, the present technique uses a sample by sample update and avoids the need for these large chunks of input data. Thus, the present system can make updates on small pieces of data, like a signal prefix (or cyclic prefix). This allows for estimation of interference that is learned while listening to the signal. This can allow a receiver to recover quickly from an interference attack that interrupts communication. For example, even if a jammer periodically or infrequently hits a signal, the present technique can estimate the interference during packet reception. Additionally, even in the case of a constant jammer or changes in the environment of the receiver, the present technique can allow for efficient recovery of the signal. For example, from the beginning of a packet to the end of packet, a channel can have changed if things in the environment or the receiver are moving quickly because the paths with interference change much more quickly than the movement of the receiver in the actual physical environment. The present technique may facilitate tracking of these changes.

Example Hardware

Figure 2:
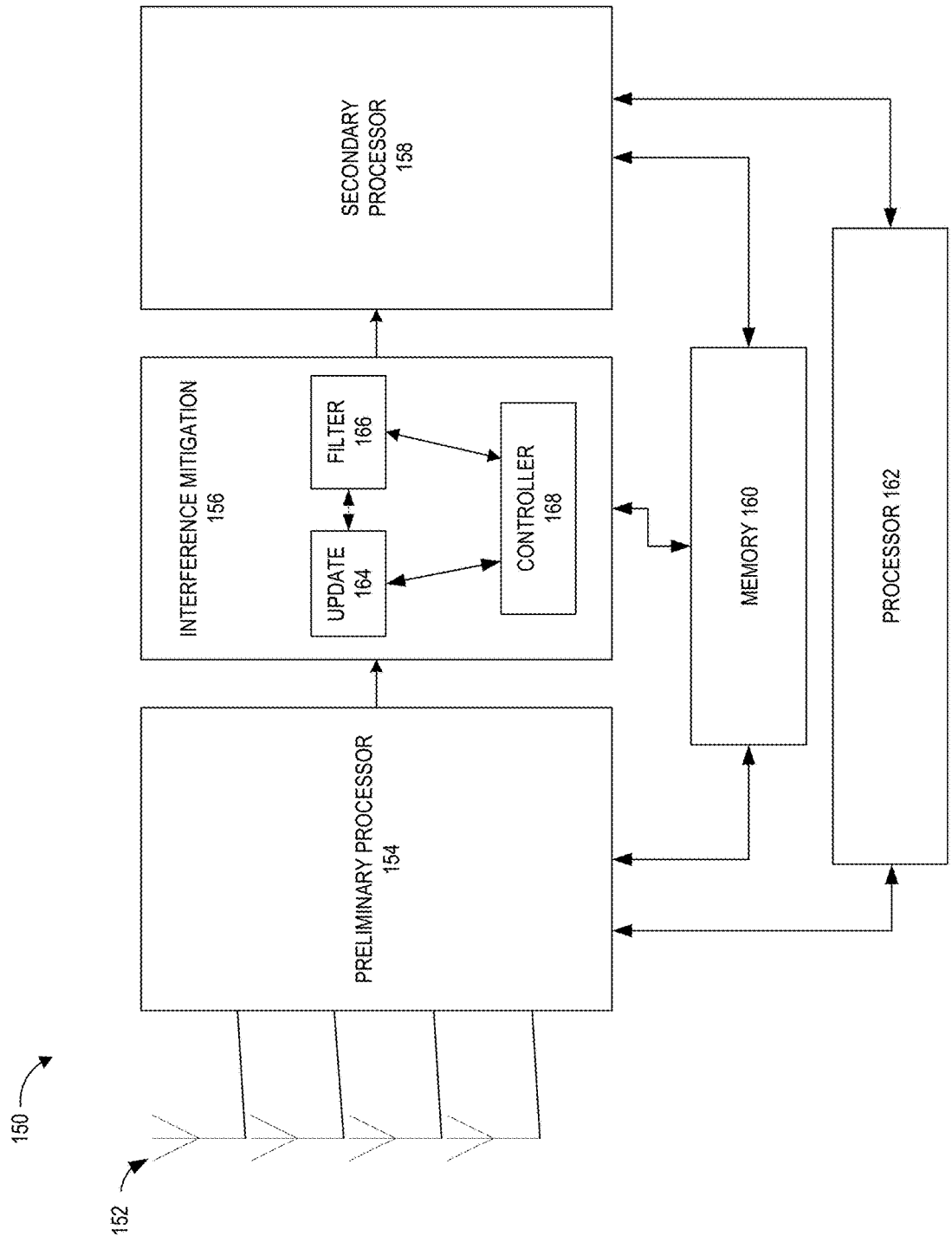
FIG. 2 is a functional block diagram of an example receiver having an interference mitigation module.

FIG. 2 is a functional block diagram of an example receiver having an interference mitigation module according to the systems and methods described herein. The receiver 150 may include a number of antennas 152. Without limiting the number, the receiver 150 can have two, three, four, or more antennas. In some examples, the antennas are configured for both reception and transmission of signals. In some examples, the antennas are only configured for receiving signals. In some examples, the receiver 150 can have a different number of transmitting antennas than receiving antennas. The antennas are electrically coupled to a preliminary processor 154.

The receiver includes both a preliminary processor 154 and a secondary processor 158. The preliminary processor 154 can include mechanisms for processing received signals prior to interference mitigation, and the secondary processor 158 typically includes mechanisms for processing the filtered communication signal. The preliminary processor 154 can include modules for analog gain control (AGC), spatial, temporal, or frequency-based filtering, such as bandpass or halfband filtering, and/or performing a Fourier or inverse Fourier transform. The secondary processor 158 can include modules such as a demodulation module, a Fourier transform or inverse Fourier transform module, a decoder module for decoding signals coded using an error-corrective code such as a Hamming code, a convolutional code, a turbo code, or a low-density parity check (LDPC) code, a deinterleaving module, and a demultiplexer. In other embodiments, modules which are listed as being associated with the secondary processor 158 can be included in the preliminary processor 156.

The receiver also includes an interference mitigation module 156 which receives data from the preliminary processor 154 over a data link, performs an interference mitigation procedure on the data received from the preliminary processor 154, and then transfers the filtered data to the secondary processor 158 over a data link 350. The interference mitigation module 156 can include a number of sub-components, as discussed in detail below.

The receiver can also include a microprocessor 160 and a memory 162. The microprocessor can be used by any of the other components, such as the primary processor 154, the interference mitigation module 156, or the secondary processor 158 to perform data calculations. As used herein, the term "processor" refers broadly to any suitable device, logical block, module, circuit, or combination of elements for executing instructions. The microprocessor 160 can be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor can be any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor, such as microprocessor 160 can be a conventional microprocessor, but in the alternative, the microprocessor 160 can be any conventional processor, controller, microcontroller, or state machine. Microprocessor 160 can also be implemented as a combination of computing devices, e.g., a combination of a DSP and a microprocessor, a plurality of microprocessors, one or more microprocessors in conjunction with a DSP core, or any other such configuration.

The memory 162 can also be connected to the other components of the receiver, such as the preliminary processor 154, the interference mitigation module 156, the secondary processor 158 and the microprocessor 160. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors of the receiver 300. Other types of memory include bubble memory and core memory.

The interference mitigation module 156 comprises a number of sub-components, including at least one update submodule 164, at least one filter submodule 166, and a controller 168. The at least one update submodule 164 and at least one filter submodule 166 can receive data from the preliminary processor 154 over a data link. The submodules are electrically coupled to the controller 168 which controls the functions of the submodules.

The at least one update submodule 164 may be configured to receive signals from antennas 152. The signals may be transferred from the preliminary processor 154. The at least one update submodule 164 may generate and adapt a set of filters in order to minimize an output power. The at least one filter submodule 166 may apply at least one updated filter to signals from the antennas, such as the communication signal comprising the signal of interest embedded in noise and interference.

In some examples, a receiver may switch between the present technique and another technique for interference mitigation. In some examples, the present technique is implemented as part of the interference mitigation module as firmware.

Example Interference Mitigation

Figure 3A:
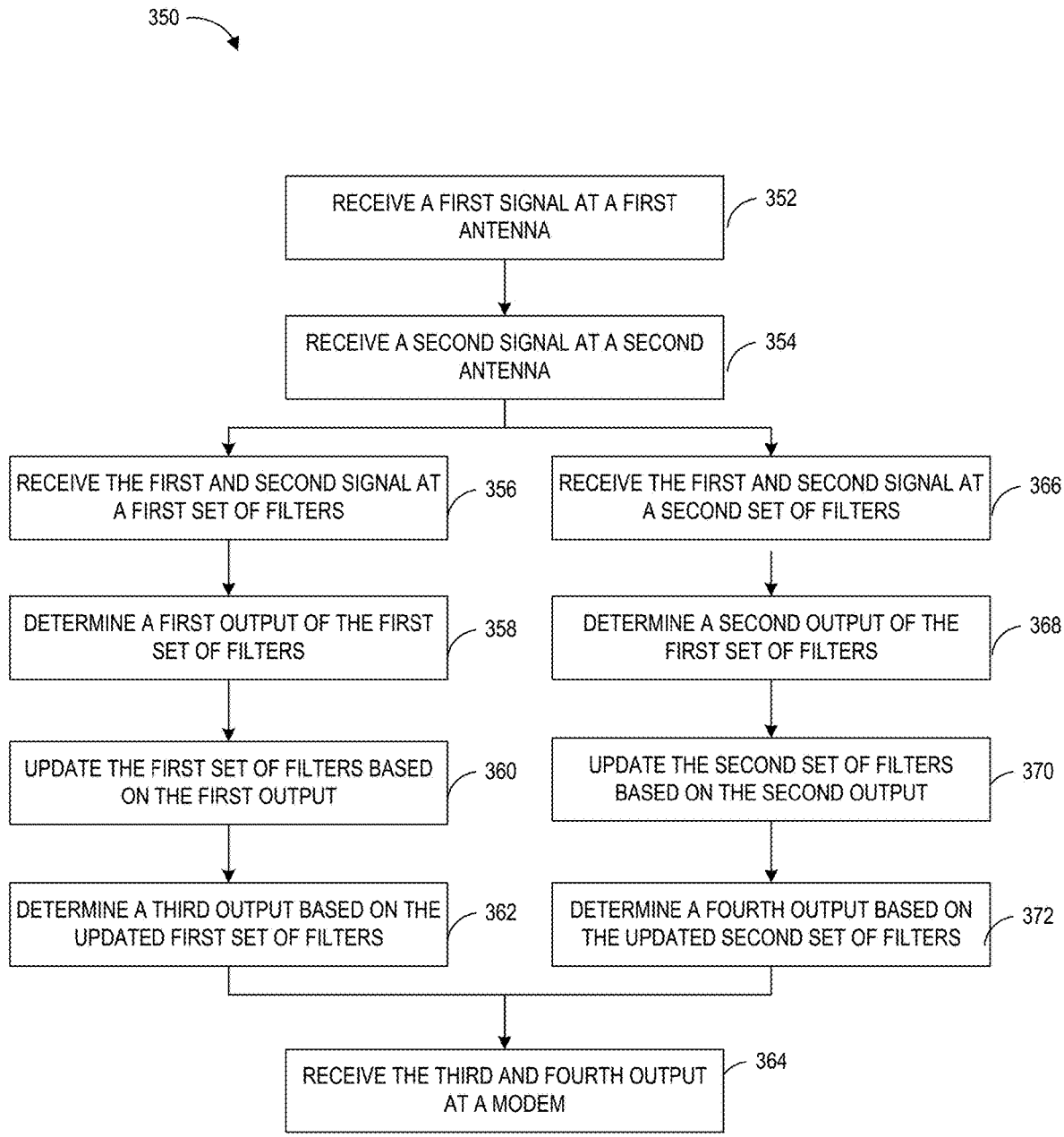
FIGS. 3A and 3B illustrate example processes that may be used by an interference mitigation module using a plurality of signals received at a plurality of antennas.
Figure 3B:
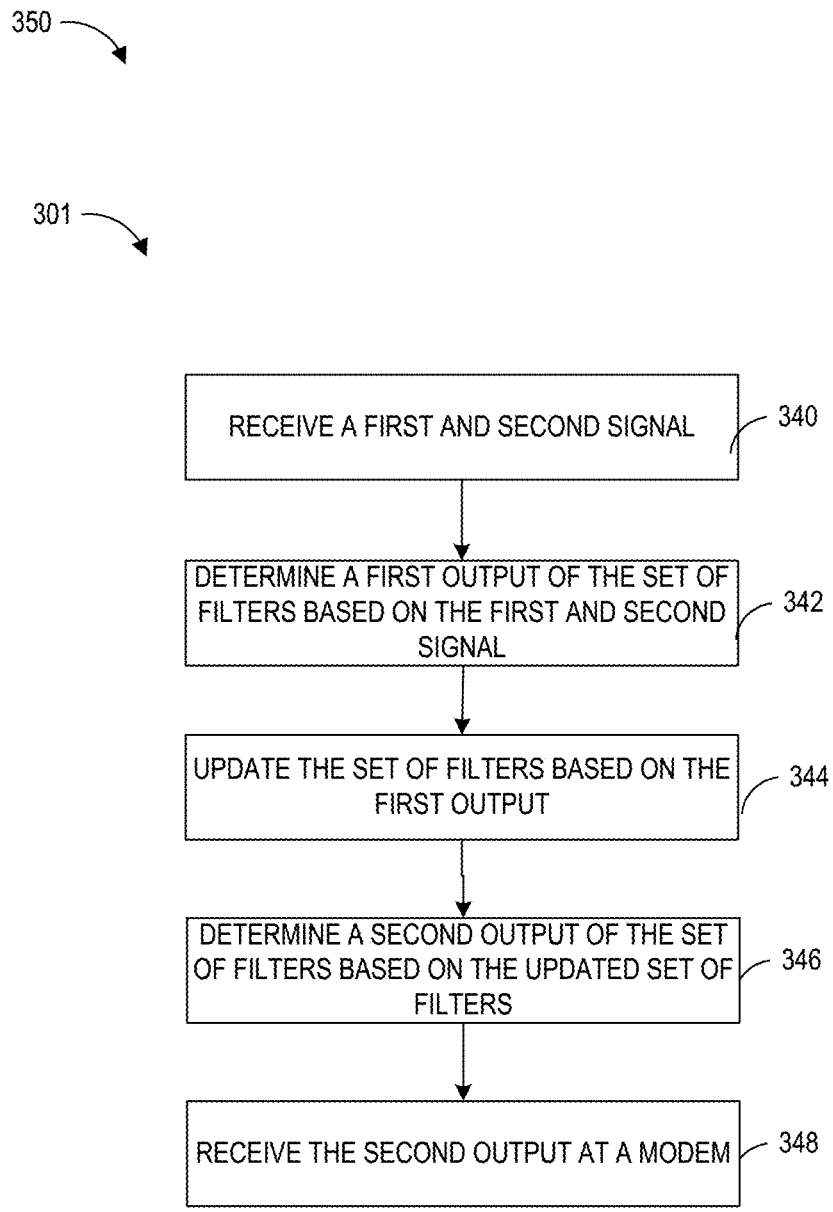

FIGS. 3A and 3B illustrates example canceller or mitigation processes that may be part of an interference mitigation module 156 as applied to a multiple antenna system, such as described with reference to FIG. 2. While the illustrated example references a certain number of signals, antennas, filters and steps, any suitable number of signals, filters, antennas, and steps may be used. For example, more than two signals may be received at more than two antennas or transceivers and processed to generate one or more signal outputs. For example, systems and methods described herein can apply to any number of input signals greater than 1 and any number of output signals greater than 0. For example, but a number of inputs to outputs can include 2:1, 3:1, 3:2, 3:3, 4:1, 4:4 or others. The illustrated example processes can include a plurality of blocks or steps, update modules, and/or filters. However, fewer, more or alternative steps or blocks may be used as part of the processes.

FIG. 3A illustrates an example implementation of a mitigation process 350 as applied to a multiple antenna system with multiple inputs and multiple outputs. At a block 352, a system may receive a first signal at a first antenna. At a block 354, a system may receive a second signal at a second antenna. The first and second antenna may be part of a single hardware device or be part of different hardware devices configured to communicate with each other. In some examples, the first and second antenna may be part of physically separated transceiver units and one or more aspects of the process 150 may be performed by physically separate devices or controllers. In some examples, an element (such as a device, apparatus, controller, processor or other element) that performs one or more operations described herein may not necessarily include the antennas, and may be coupled to the antennas. For instance, a device (like a chipset or transceiver) may be coupled to antennas that transmit and receive signals, and the device may perform different processing on those signals. In some examples, the first and second signals may be a signal(s) transmitted by a transmitter or transceiver, such as a hardware device that includes a receiver 150 described with reference to FIG. 2. The first and second signals may include a wanted portion of a signal and some combination of noise and interference. In some examples, the combination of noise and interference may be different for the first and second signals.

At a block 356, a system may receive the first and second signal at a first set of filters. The first set of filters may include two or more filters configured to process the first and second signals. In some examples, the first set of filters may include a primary filter and one or more secondary filters. Each of the filters may be configured to process one or more of the signals. The filters may be Finite Impulse Response (FIR) filters or other signal processing filter or combination of filters. In some examples, the first set of filters may include a primary FIR filter having a plurality of taps, where a center tap is fixed. The first set of filters may further include a secondary FIR filter having a plurality of taps without a fixed tap. The total number of taps for each filter may be the same. For example, a first or primary filter may have 16 taps and a second or secondary filter may have 16 taps. In some examples, the primary filter may be configured to process the first signal and the second or secondary filter may be configured to process the second signal.

At a block 358, a system may determine a first output of the first set of filters. In some examples, output(s) of the first set of filters may be combined. For example, in the example of a primary filter and secondary filter, a system may subtract the output of the secondary filter from the output of the first primary filter. In another example, the system may add the output of the secondary filter from the output of the first primary filter.

At a block 360, a system may update the first set of filters using one or more update blocks or modules. For example, the system may include one or more update modules or blocks configured to apply one or more optimizations to the output. An optimization algorithm can include, but is not limited to a Least Mean Squares (or LMS) algorithm. The one or more update blocks may be configured to apply a LMS algorithm to the outputs to minimize output power. An output of the one or more update modules or blocks may include one or more filter parameters. For example, an LMS algorithm may output updated filter taps for the first and second set of filters in order to minimize the output power. At a block 362, a system may generate a filtered signal (or third output) based on the updated first set of filters.

It should be noted that embodiments are not limited to minimization of output power as a criterion to update filter weights/taps in operations described herein, as other criteria may be used. For instance, a technique may minimize, maximize, reduce, or increase one or more metrics, and the metric(s) may include power, magnitude, correlation, cross-correlation, inner product, or other. In an example, the first signal from a first antenna is input to a first filter, which has one tap fixed and the other taps variable (via updating). A second signal from a second antenna is input to a second filter, which has variable taps. The error signal may be a sum of the outputs of the first and second filters, and the power of the error signal may be maximized. In some examples, the first filter may have L1 taps and the second filter may have L2 taps, and the error signal may be equal to the sum of: 1) the fixed tap of the first filter multiplied by a delayed or non-delayed version of the first signal, 2) a sum of products (inner product) of the other (L1-1) taps of the first filter and (L1-1) delayed or non-delayed versions of the first signal, and 3) a sum of products (inner product) of the L2 taps of the second filter and L2 delayed or non-delayed versions of the second signal. In some cases, when the first and second signals include interference without signal, the 1 st term above may be considered as interference on the first antenna (for example, if the fixed value of the tap is 1.0), while the sum of the 2nd and 3rd terms described above may converge toward an estimate of that interference multiplied by −1.

At a block 366, a system may perform a similar process as described with reference to block 356. For example, a second set of filters may be configured to process the first and second signals. In some examples, the second set of filters may include a primary filter and one or more secondary filters. Each of the filters may be configured to process one or more of the signals. The filters may be Finite Impulse Response (FIR) filters or other signal processing filter or combination of filters. In some examples, the second set of filters may include a primary FIR filter having a plurality of taps, where a center tap is fixed. The second set of filters may further include a secondary FIR filter having a plurality of taps without a fixed tap. The total number of taps for each filter may be the same. For example, a first or primary filter may have 16 taps and a second or secondary filter may have 16 taps. In some examples, the primary filter may be configured to process a different signal than the primary filter of the first set of filters. For example, the primary filter of the second set of filters may be configured to process the second signal and the second or secondary filter may be configured to process the first signal.

At a block 368, a system may perform a similar process as described with reference to block 358. In some examples, a system may determine an output of the second set of filters. In some examples, output(s) of the second set of filters may be combined. For example, in the example of a primary filter and secondary filter, a system may subtract the output of the secondary filter from the output of the first primary filter.

At a block 370, a system may perform a similar process as described with reference to block 360. In some examples, a system may apply a one or more update modules or blocks configured to apply one or more optimizations to the output. An optimization algorithm can include, but is not limited to a Least Mean Squares (or LMS) algorithm. The one or more update blocks may be configured to apply a LMS algorithm to the outputs to minimize output power. An output of the one or more update modules or blocks may include one or more filter parameters. For example, an LMS algorithm may output updated filter taps for the first and second set of filters in order to minimize the output power. At a block 372, a system may generate a filtered signal (or fourth output) based on the updated first set of filters. At a block 364, a system may receive the filtered signals at a modem. The received signals may correspond to a first and second signal having reduced interference mitigation.

In some examples, a first filter and second filter may be updated, wherein one tap of the first filter is fixed, while the other taps of the first filter and the taps of the second filter are not fixed. The scope of embodiments is not limited to this example, however. In some examples, one or more taps of the first filter may be fixed and the other taps of the first filter are updated. In some examples, one or more taps of the first filter are fixed, one or more taps of the second filter are fixed, and the remaining taps of the first and second filters are updated.

In some configurations of the process 350, where each antenna element is physically separated, the system may be configured to send one or more error signals or one or more filtered signals to the distributed receivers where one or more update modules operate independently. In some configurations of the process 350, the first signal may include the wanted signal and the second signal may include a signal of a self-interference source.

FIG. 3B illustrates an example implementation of a mitigation process 301 as applied to a multiple antenna system with multiple inputs and a single output.

With reference to FIG. 3B, at a block 340, a system may receive a plurality of signals that may include a first and second signal. The signals may be received at one or more antennas that may be part of a single hardware device or be part of different hardware devices configured to communicate with each other. In some examples, the signals may be received at physically separated transceiver units and one or more aspects of the process 301 may be performed by physically separate devices or controllers. In some examples, the first and second signals may be a signal(s) transmitted by a transmitter or transceiver, such as a hardware device that includes a receiver 150 described with reference to FIG. 2. The first and second signals may include a wanted portion of a signal and some combination of noise and interference. In some examples, the combination of noise and interference may be different for the first and second signals.

At a block 342, a process the first and second signals to generate a first output based on a set of filters. The set of filters may include two or more filters configured to process the received signals. In some examples, the set of filters may include a primary filter and one or more secondary filters. Each of the filters may be configured to process one or more of the signals. The filters may be Finite Impulse Response (FIR) filters or other signal processing filter or combination of filters. In some examples, the first set of filters may include a primary FIR filter having a plurality of taps, where a center tap is fixed. The set of filters may further include a secondary FIR filter having a plurality of taps without a fixed tap. The total number of taps for each filter may be the same. For example, a first or primary filter may have 16 taps and a second or secondary filter may have 16 taps. In some examples, the primary filter may be configured to process the first signal and the second or secondary filter may be configured to process the second signal.

At a block 344, a system may update the first set of filters using one or more update blocks or modules. For example, the system may include one or more update modules or blocks configured to apply one or more optimizations to the output. An optimization algorithm can include, but is not limited to a Least Mean Squares (or LMS) algorithm. The one or more update blocks may be configured to apply a LMS algorithm to the outputs to minimize output power. An output of the one or more update modules or blocks may include one or more filter parameters. For example, an LMS algorithm may output updated filter taps for the first and second set of filters in order to minimize the output power.

At a block 346, a system may generate a filtered signal based on the updated first set of filters. Blocks 344 and 346 may be repeated such that the output of block 346 is processed at a block 344 in order to produce an updated set of filters. In some examples, the steps or blocks may be repeated until a threshold condition is met. In some examples, the steps or blocks may be repeated while a continuing condition is met. A continuing condition may be based on, for example, the received signal. For example, if a received signal contains a silent period, the blocks may be repeated during the silent period.

At a block 348, a system may receive the filtered signal at a modem. The received signal may correspond to a signal having reduced interference mitigation.

Figure 3C:
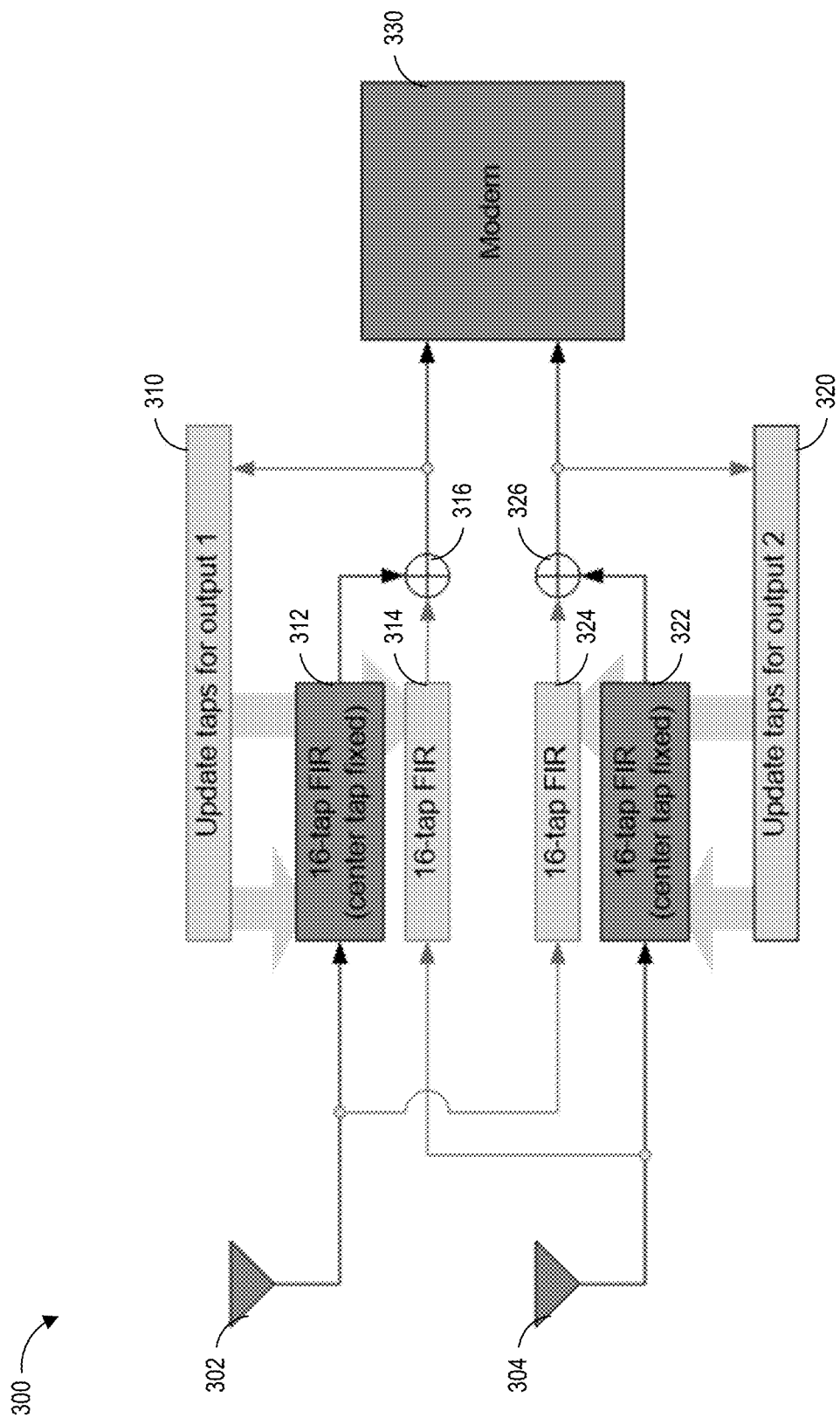
FIG. 3C illustrates an example application of the process for an interference mitigation module that may be part of a multiple antenna system, such as described with reference to FIG. 2.

FIG. 3C illustrates an example implementation of a canceller or mitigation process, such as described with reference to FIG. 3A. In the illustrated example, the antenna system includes a 2 antenna system that includes 2 receivers 302, 304 that may receive and possibly transmit signals and 2 inputs to a modem where demodulation and decoding of a wanted signal occurs. However, the techniques described herein can be applied to any number of N>1 input signals and any number of M (where 0<M<N+1) output signals sent to the modem.

As illustrated, a canceller 300 can receive a first signal from a first receiver 302 and a second signal from a second receiver 304. Each output of the canceller is formed at block 316, 326 by a combination of two filtered inputs. A first set of filters, such as a first primary input filter 312 and a first secondary input filter 314 may process the first signal and second signal such that the first signal is processed by the first primary input filter 312 and the first secondary signal is processed by the second filter 314. A second set of filters, such as a second primary input filter 324 and a second secondary input filter 322 may process the first signal and second signal such that the second signal is processed by the second primary input filter 324 and the first signal is processed by the second secondary input filter 322. Each filter may include a Finite Impulse Response (FIR) filter. While the illustrated example illustrates an FIR filter of length 16, a filter of any number L>0 could be used. However, while the more taps there are in the filter, the more capable the technique is at adapting to highly frequency selective conditions, the slower the adaptation and convergence.

It is important to note that the symmetric choice of L taps per FIR (L=16 in the example) is not necessary and one of the inputs could be subjected to a shorter FIR than the other. However, the total number of taps would have to remain the same to achieve similar cancellation quality in frequency selective channels. A symmetric approach thus achieves better latency and would be a preferred implementation style.

The filter taps of each set of filters, except for one tap for each set, such as a tap of a first and/or second primary input filter 312, 322, are adapted to minimize the output power at an update block 310, 320. In some examples, the filter taps may be adapted using a Least Mean Squared (LMS) algorithm. Adaptation using other techniques could be used similarly but LMS is the least complex. From the perspective of each update block 310, 320, the input is completely unknown. The 2-input-1-output sub-system thus appears as a single input filter with twice as many filter taps. The update engine 310, 320 is unable to change the center tap of the first FIR. To minimize output power then, it must thus utilize the remaining total available taps to remove the signal presented by the fixed tap. Due to fundamentals of finite-impulse-response filtering, the signal presented by the fixed tap cannot be cancelled using other taps from the same input but must utilize the second available antenna. The additional taps per FIR are used to equalize for the wideband nature of the propagation channels, matching the responses of the two interference channels at the two antennas such that power is minimized across the output bandwidth.

It is of note that, because of the lack of trivial "all zeros" weighting, the solution achieved by the LMS adaptation reduces the interference, to the extent supported by the FIR taps, but does not cancel signals that arrive through other propagation channels with different incident responses at the antennas. For example, in an open line-of-sight environment, the weighted filters form a wideband spatial null towards the interference but will not block signal reception in other directions. This simplified model extends similarly to multipath environments whereby a frequency dependent null is formed.

In the presence of only uncorrelated noise at the antennas (no interference), the LMS adaptation will converge to all zero taps on the second input filter and a noise whitening filter on the primary input filter as to not amplify the noise. As such, the input to the modem 330 under no interference would resemble the original input at the antennas as far as signal to noise ratio and propagation channel conditions are concerned.

Additional Example Interference Mitigation

An OFDM signal is a type of digital signal and method of encoding digital data on multiple carrier frequencies. As part of normal OFDM operation, each symbol contains a cyclic guard or cyclic prefix. A cyclic guard is typically a repeated section of the beginning of the symbol that is placed again at the end of the symbol to allow for cyclic FFT (Fast Fourier Transform) processing. The guard, which can be, for example, 16 samples for a 64 sample symbol in indoor applications, should be longer than the channel delay spread to allow for no inter-symbol interference during processing.

In the scenario where significant interference is present, the signal quality is not set by signal to noise ratio (SNR), nor is it set by inter-symbol interference (ISI). Instead the signal quality is set by the residual signal-to-interference-and-noise ratio (SINR) after cancellation. As such, if the SINR is higher than the residual ISI, the cyclic guard could be used to update the interference cancellation filters. In some examples, the tail end of the cyclic guard can be used to update an adaptation or update scheme, such as an LMS filter, achieving significant interference reduction in return for unnoticeable ISI degradation.

Due to the cyclic guard, the present technique can do without a reference signal and may perform interference tracking during reception of a packet. The cyclic guard or other repeated copy or portion of a signal may be used to calculate error in the signal and drive an update to the adaptive canceller. Advantageously, the present technique may be applicable to more than just OFDM signals. For example, the present technique may be used for any signal with a repeated portion or silent portion.

Figure 4A:
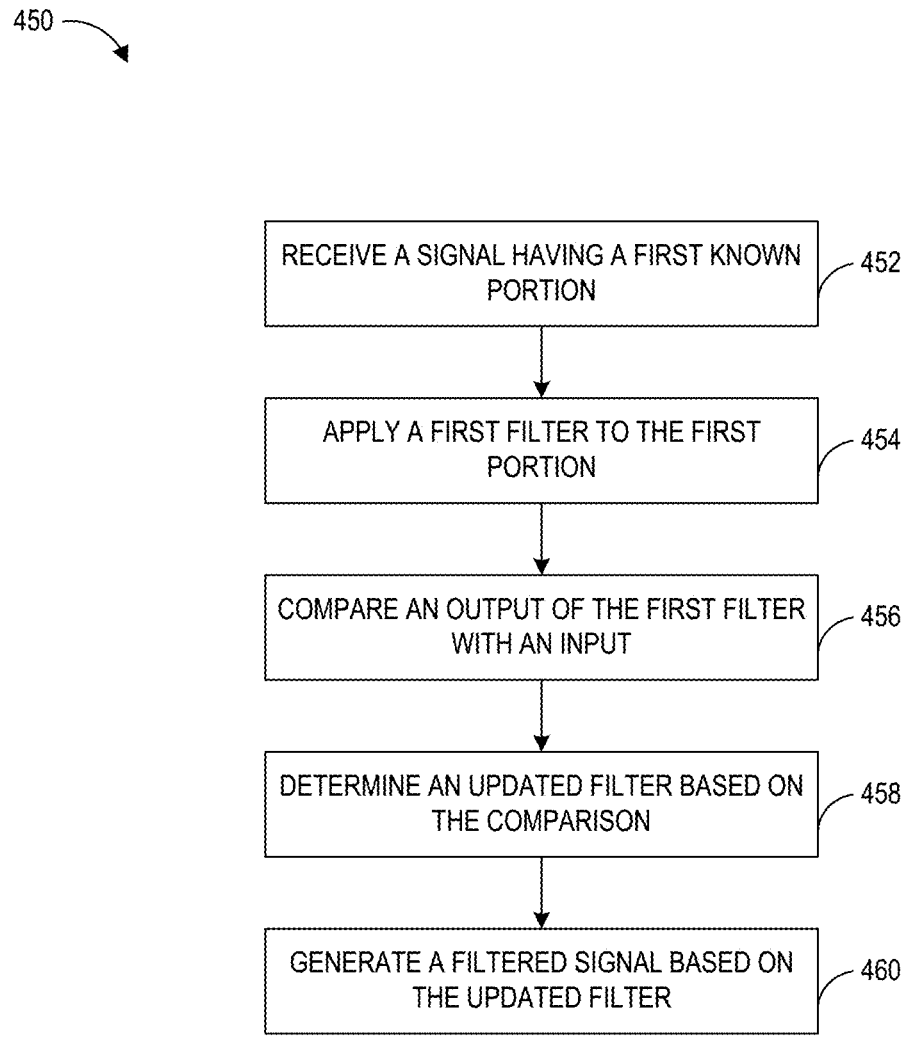
FIG. 4A illustrates an example process for an interference mitigation module using a signal with a known portion or component.

FIG. 4A illustrates another example process 450 that may be implemented by an interference mitigation module, such as described with reference to FIG. 2. In the illustrated example, a receiver is configured to receive a signal, such as an OFDM signal that has a repeated portion. However, the same technique can be applied to non-OFDM signals using any silence periods, known repeated samples, or other features of the wanted waveform. A process 450 can include a plurality of blocks or steps, update modules, and/or filters. However, fewer, more or alternative steps or blocks may be used as part of the process 450.

At a block 452, a system may receive one or more signals having a first known portion. In some examples, the one or more signals can include at least one OFDM signal and the first known portion may include a cyclic guard. In some examples, the one or more signals may include a silent portion. In some examples, the one or more signals may include a one or more known features. In some examples, the one or more signals may include repeated portion(s).

At a block 454, a system may apply a first filter to at least the first known portion of the received signal. A first filter may include, but is not limited to one or more signal processing filters such as an FIR filter or filters. In some examples, the system may extract or identify the first known portion from the signal before or after filtering. For example, in the case of an OFDM signal, the system may extract the cyclic guard and apply the filter to the cyclic guard. In some examples, a system may identify a silence period of the signal and apply a filter to the silence period. In some examples, a system may identify a known feature of the signal and apply a filter to the known feature.

At a block 456, a system may compare an output of the first filter with the input. For example, the system may subtract or sum the output and the input. At a block 458, the system may determine an updated filter based on the comparison. For example, the system may apply an adaptation scheme, such as an LMS algorithm, to the comparison and generate updated filter parameters, such as a filter taps for an FIR filter, based on the comparison. In some examples, the adaptation scheme may be configured to minimize a difference between the input and output.

At a block 460, a system may generate an updated filtered signal based on the updated filter by applying the updated filter parameters. The updated filter signal may be used as the final filtered signal. In some examples, the system may reiterate one or more steps, such as blocks 454 to 458 to further adapt the filter and generate a more accurate updated filter signal prior to outputting the filtered signal. In some examples, the updated filter may be adapted in a manner so as to not interrupt the signal stream during adaptation and the one or more adapted parameters of the updated filter may be applied or used after adaptation in real time.

Figure 4B:
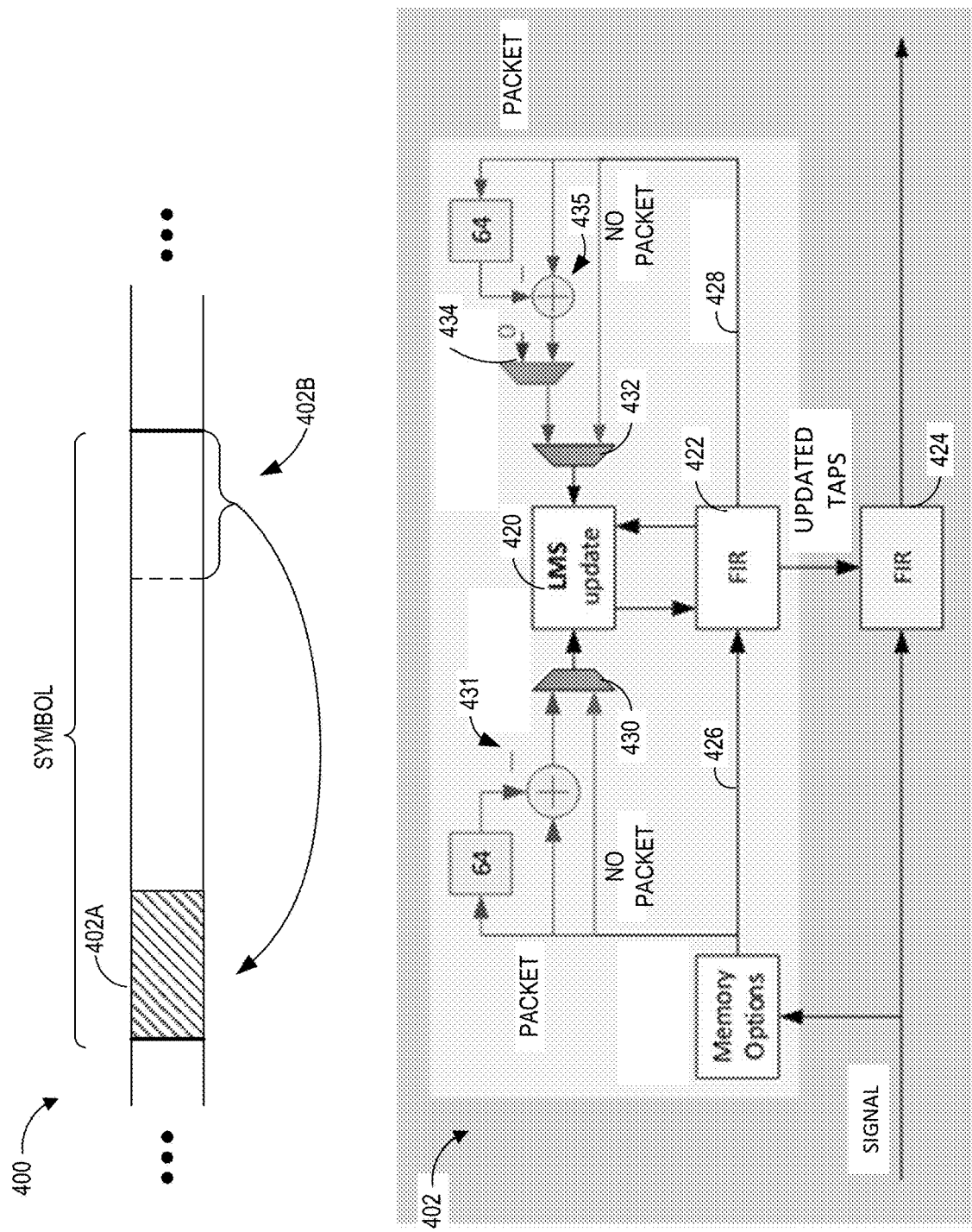
FIG. 4B illustrates an example of how adaptation without reference can proceed using an OFDM signal.

FIG. 4B illustrates an example application of how an adaptation without reference can proceed using one or more OFDM signals. For the case of an input composed of signal along with interference and noise, an adaptation approach continues through the received signal packet knowledge of pilot symbols and without explicit insertion of any training samples in the wanted signal. Instead, in the case of one or more OFDM signals, the invention utilizes the nature of the OFDM waveform and requires only knowledge of the edge of the OFDM symbols (a timing signal received from the modem). It is of note that the example process illustrated in FIG. 4B can include processing any number of input signals greater than 1 and any number of output signals greater than 0. For example, but a number of inputs to outputs can include 2:1, 3:1, 3:2, 3:3, 4:1, 4:4 or others.

As illustrated in FIG. 4B, a transmitted OFDM signal 400 may include one or more symbols. It is of note that while a certain number of symbols and symbol portions and a certain length of symbols and symbol portions are illustrated, a signal packet may include any number of symbols and symbol portions of any suitable length. In the illustrated example, a symbol may include a plurality of portions, wherein a portion at the end of the symbol 402B is repeated at the beginning of the symbol as a cyclic guard 402A. By subtracting at least a portion 402A of the signal that is presumed to be the same or repeated at the end of the symbol (in a portion 402B) from the second portion 402B, a controller may determine an estimate of residual interference. The portions 402A and 402B of the waveform 401 are presumed identical (under the assumption of ignoring residual ISI). Utilizing sections of the received signal to estimate interference allows the LMS update to run at least once per symbol where there is a packet detected and run continuously when no packet is detected.

With continued reference to FIG. 4B, an interference mitigation module may be configured to pass a signal through an update submodule 402 in order to update taps for a filter module 424. The filter module 424 may be configured to process the signal based on the updated taps. Because signals pass through the update submodule 402 before they reach the modem, the interference mitigation module performs adaptation but withholds the application of the updated weights or taps until the modem has indicated whether a packet is present. This is implemented, in the illustrated example, by utilizing two identical filter sets 422 and 424 for adaptation and application.

Adaptation in the presence of a signal must perform subtraction across the length of each symbol. Thus, the adaptation input and output must both be subjected to this subtraction for LMS to operate seamlessly. This is implemented, in the illustrated example, using the multiplexors 430, 432, 434 and subtractors 431, 435. For example, in the illustrated example, a signal is received at an update submodule 402. If the signal has no packet, then the submodule 402 may run an update 420 continuously. If the signal has a packet, then the submodule 402 may run an update 420 once per symbol by subtracting at least a portion of the cyclic guard of a symbol. In the illustrated example, a packet includes a 64 sample symbol. An output 428 of a filter 422 may be subjected to subtraction for the reasons discussed above. An output 428 of the filter 422 may be approximately the error. As shown, in the case of a normal sample, an output used for the LMS update 420 may be zero. In the case of a redundant sample, an output used for the LMS update 420 may be the calculated output. As noted above, the resulting adaptation input and output are processed by the LMS update block 420. Depending on if the signal has a packet or no packet, the submodule 402 may run the adaptation again or send the updated taps to a filter block 424 for processing of the input signal.

Example Application

Figure 5:
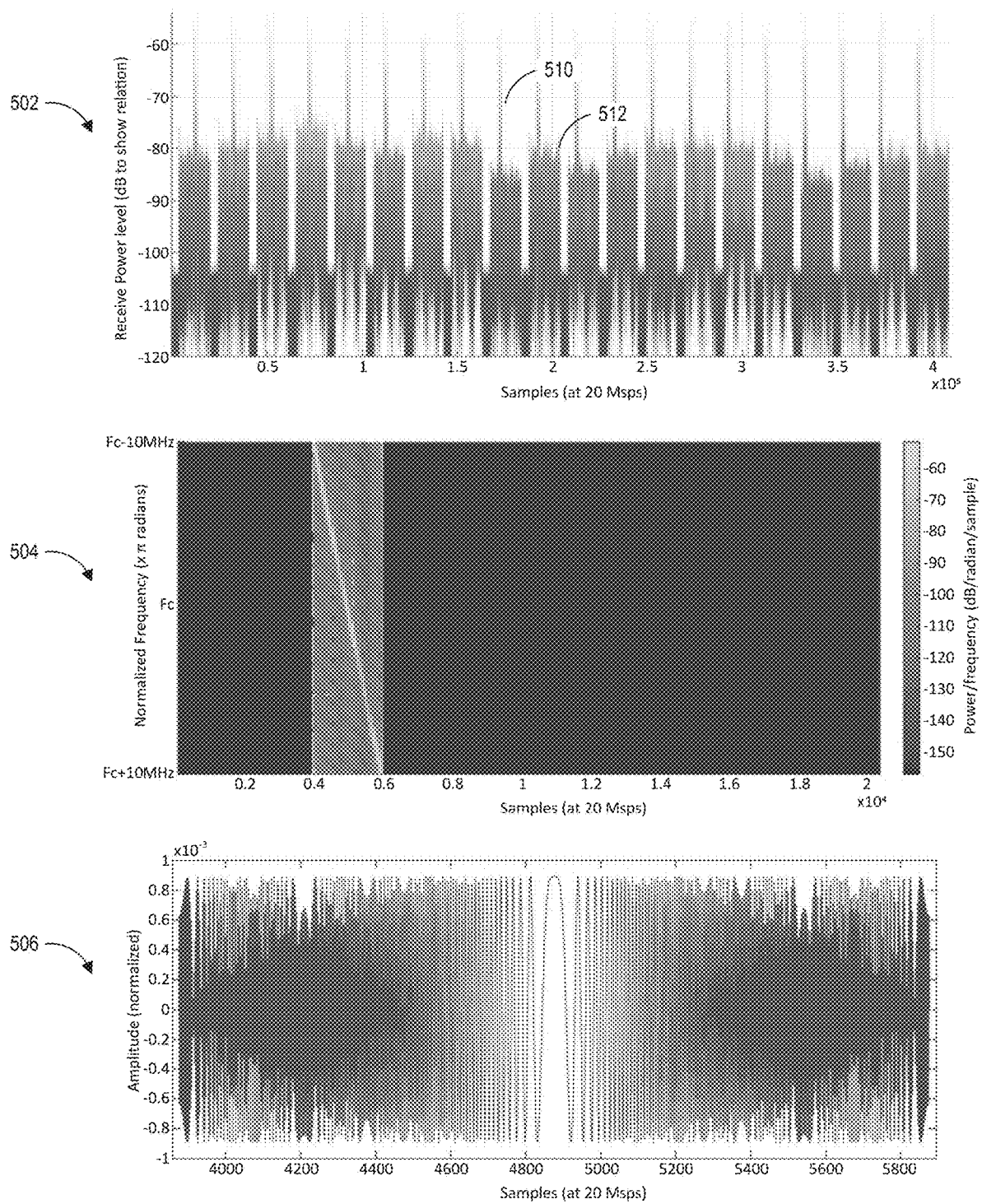
FIG. 5 illustrates an example of the effectiveness of the systems and methods described herein at adapting to dynamic interference.

FIG. 5 illustrates an example of the effectiveness of the present technique at adapting to dynamic interference. FIG. 5 illustrates a simulation of a waveform signal 512 with an interference chirp 510 that passes through a 20 MhZ band within 100 microseconds and returns every 1 millisecond. Graph 502 illustrates time domain packets hit by a sweeping chirp that appears as a thin pulse over the packets. Graph 504 illustrates a spectrogram of one interference period showing sidelobes in-band while passing through. Graph 506 illustrates a close up view of the interference chirp in the time domain.

Some of the advantages of the present technique include the ability to adapt to and cancel or mitigate interference, wideband or otherwise, without a reference signal, using two or more input measurements (antennas). Additionally, the present technique is able to adapt to and cancel or mitigate interference in the presence of an unknown OFDM wanted signal using only the knowledge of the symbol edge time. Additionally, the present technique is able to track changing interference cancellation weights, such as due to mobility by the receiver or interference source, across multiple signal and interference bursts without interruption or reset. Additionally, the present technique has improved implementation simplicity whereby least mean square updates and finite impulse response filters can be used with said filters providing minimal latency in the signal path.

Additionally, beyond the application of the present technique to interference cancellation for multiple antenna wireless transceivers, the technique has advantages in other uses. Some other uses include, but are not limited to distributed interference cancellation, self interference cancellation, and post distortion correction.

In distributed interference cancellation, each antenna element of an input is available at a physically separated transceiver unit. Here, the present technique would only require the return of the error signal to the distributed receivers whereby LMS updates can be independently realized. The extension to adaptation and tracking through noise and packets may apply similarly.

In self interference cancellation or co-site interference cancellation, a second input comes directly from the self-interference source. The advantages of cancelling self-interference using a symmetric two FIR system, adaptation without reference signals, and adaptation during OFDM packets may apply similarly.

Terminology

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A method of suppressing interference in a wireless communication system, the method comprising:
   receiving a first input signal at a first antenna;
   receiving a second input signal at a second antenna;
   generating, using a first set of filter weights and the first input signal, a first filtered output, the first set of filter weights comprising at least one filter weight fixed to a predetermined value and one or more variable filter weights;
   generating, using a second set of filter weights and the second input signal, a second filtered output, the second set of filter weights comprising variable filter weights;
   determining a first error signal based on a sum of the first filtered output and the second filtered output; and
   updating the first and second filter weights based on the first error signal, wherein the updating is performed in accordance with a minimization of power in the first error signal, wherein the second set of filter weights is updated to minimize a power in the first error signal due to the at least one filter weight of the first set of filter weights that is fixed at the predetermined value.

2. The method of claim 1, wherein the first set of filter weights or the second set of filter weights are associated with an FIR filter.

3. The method of claim 1, comprising outputting the first error signal to a modem.

4. The method of claim 3, wherein the modem is configured to demodulate or decode the first error signal.

5. The method of claim 1 comprising demodulating the first error signal to produce a demodulated pack of bits.

6. The method of claim 1, wherein the predetermined value is 1.

7. The method of claim 1, wherein a filter weight of the first set of filter weights comprises a center tap.

8. The method of claim 7, wherein the center tap is fixed to the predetermined value.

9. The method of claim 1, comprising determining whether a packet is present in the first or second input signals.

10. The method of claim 9, wherein updating the first error signal based on the first and second set of filter weights is in response to determining that the packet is not present in the first or second input signals.

11. The method of claim 10, wherein the first and second input signals are sampled according to a predetermined sampling period.

12. The method of claim 11, wherein updating the first error signal based on the first and second set of filter weights is performed for each sample of the first and second input signals.

13. The method of claim 10, comprising:
   in response to determining that the packet is present:
      determining a third error signal different from the first error signal;
      updating the third error signal based on a difference between a first portion of the packet and a second portion of the packet, wherein the updating is performed in accordance with a minimization of power in the third error signal.

14. The method of claim 13, wherein the second portion of the packet comprises a repeated portion.

15. The method of claim 13, wherein the packet comprises a signal of interest component and at least one of a noise component or an interference component and wherein the second portion of the packet comprises at least a portion of the signal of interest component present in the first portion of the packet.

16. The method of claim 13, wherein the first input signal or the second input signal comprises an OFDM signal and wherein the second portion of the packet comprises a cyclic prefix.

17. The method of claim 1, wherein the first input signal or the second input signal comprises an OFDM signal.

18. A method of suppressing interference in a wireless communication system, the method comprising:
   receiving a first input signal at a first antenna;
   receiving a second input signal at a second antenna;
   generating, using a first set of filter weights and the first input signal, a first filtered output;
   generating, using a second set of filter weights and the second input signal, a second filtered output;
   generating, using a third set of filter weights and the first input signal, a third filtered output;
   generating, using a fourth set of filter weights and the second input signal, a fourth filtered output;
   determining a first error signal based on a sum of the first filtered output and the second filtered output;
   determining a second error signal based on a sum of the third filtered output and the fourth filtered output;
   updating the first and second filter weights based on the first error signal, wherein the updating is performed in accordance with a minimization of power in the first error signal and wherein at least one filter weight of the first set of filter weights is fixed to a predetermined value; and updating the third and fourth set of filter weights based on the second error signal, wherein the updating is performed in accordance with a minimization of power in the second error signal.

19. The method of claim 18 comprising:

receiving a third input signal at a third antenna;

receiving a fourth input signal at a fourth antenna;

generating, using a fifth set of filter weights and the third input signal, a fifth filtered output;

generating, using a sixth set of filter weights and the fourth input signal, a sixth filtered output;

determining a third error signal based on a sum of the fifth filtered output and the sixth filtered output; and updating the third error signal based on the fifth and sixth set of filter weights, wherein the updating is performed in accordance with a minimization of power in the fourth error signal and wherein at least one filter weight of the fifth set of filter weights is fixed to a third predetermined value.

20. The method of claim 18, wherein at least one filter weight of the third set of filter weights is fixed to a second predetermined value.

21. An interference mitigation system comprising:

a plurality of antennas configured to receive a plurality of input signals, wherein each input signal is received at a different antenna;

one or more processors in communication with the plurality of antennas, the one or more processors configured to:

filter each of the plurality of input signals with a corresponding filter to produce a plurality of filtered input signals;

generating an error signal based on a sum of filtered input signals; and updating filter weights of the corresponding filters for each input signal based on the error signal while maintaining at least one coefficient of a first filter of the corresponding filters fixed at a predetermined value, wherein at least one coefficient of a second filter of the corresponding filters is updated to minimize a power in the error signal due to the at least one coefficient of the first filter fixed at the predetermined value.

* * * * *